June 7, 1960        E. WOLBERG        2,939,385
CORPORATE SEAL
Filed Jan. 16, 1958        2 Sheets-Sheet 1
FIG. 1
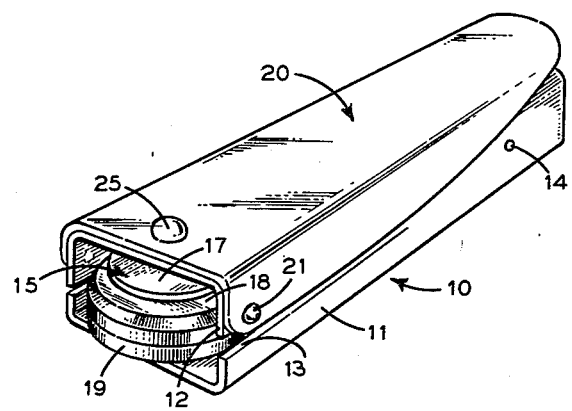
FIG. 2
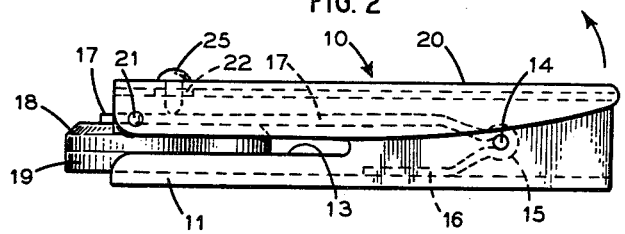
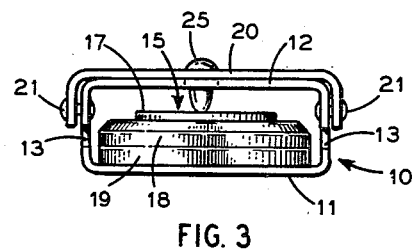
FIG. 3
INVENTOR
Erwin Wolberg
BY *Irving Seidman*
ATTORNEY June 7, 1960  E. WOLBERG  2,939,385
CORPORATE SEAL Filed Jan. 16, 1958  2 Sheets-Sheet 2

INVENTOR
Erwin Wolberg
BY
Irving Seidman
ATTORNEY

United States Patent Office 2,939,385
Patented June 7, 1960

2,939,385

CORPORATE SEAL

Erwin Wolberg, 25 Horseshoe Lane, Roslyn Heights, N.Y.

Filed Jan. 16, 1958, Ser. No. 709,254

1 Claim. (Cl. 101—3)

This invention relates to official or corporate seals and, more particularly, to novel simplified and more compact constructions of such seals.

Known corporate seals for impressing official seals into legal and other documents are heavy, bulky, and relatively difficult to operate. Generally, they are of relatively massive construction, usually involving cast metal components. A particular disadvantage, from the standpoint of storage or transportation when not in use, is the projecting operating lever. This lever projects substantially from the seal even in the seal closed position, and projects even more when the seal is open.

In accordance with the present invention, a compact light-weight corporate seal is provided by utilizing channel shape members as the body of the seal and the operating lever, with the lever embracing or telescoping over the upper wall of the seal in at least the seal-closed position. The upper seal element is mounted on the outer end of a spring extending toward the front of the seal, and the lever is pivoted to the forward end of the seal body and formed with cam means for forcing the upper seal element or die toward the mating lower seal element or die when the lever is pressed toward the seal body.

For an understanding of the invention principles, reference is made to the following description of typical embodiments thereof as illustrated in the accompanying drawings. In the drawings:

Fig. 1 is a perspective view of one form of seal embodying the invention;

Fig. 2 is a side elevation view thereof;

Fig. 3 is a front elevation view thereof;

Figure 4:
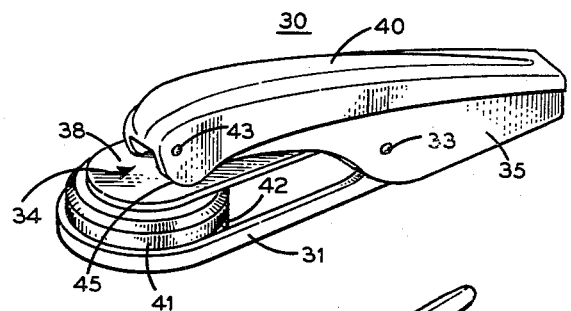
Fig. 4 is a perspective view of another form of seal embodying the invention.

Referring to Figs. 1, 2 and 3, the seal 10 therein illustrated comprises a generally box shaped body including a channel base 11 and an inverted channel top 12 united into an integral member. The body may be closed at the rear end but has an open front end. The side walls of the body are slotted for a distance inwardly from the front end as indicated at 13.

A generally flat spring 15 is bent around a cross pin 14 near the rear end of seal 10 so that a shorter end 16 of the spring bears against base 11. The longer end 17 of spring 15 extends to at least the forward end of seal 10 and carries an upper seal element 18 cooperable with a lower and mating seal element 19 to impress a seal into a document or the like inserted into slot 13. Seal element 19 is secured on base 11.

Operation of the seal is effected by an inverted channel shape operating lever 20 pivoted to the flanges of top 12 as indicated at 21, the pivotal axis being adjacent the forward end of seal 10. Lever 20 embraces top 12 in the closed position of the seal, thus providing a compact structure particularly in the seal-closed position.

Just rearwardly of pivots 21, a cam pin 25 is secured to lever 20 and projects through an aperture 22 in top 12 to bear against upper seal element 18. When lever 20 is moved to the position of Fig. 2, pin 25, engaging spring arm 17, forces seal element 18 toward mating seal element 19. To release the seal, lever 20 is swung upwardly, thus moving cam pin 25 to release spring arm 17 to spring upwardly separating seal element 18 from seal element 19.

Figure 5:
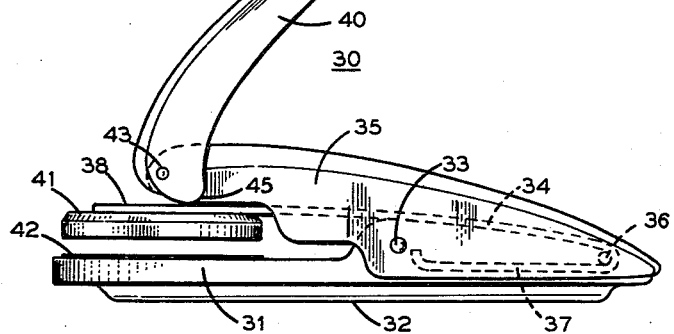
Fig. 5 is a side elevation view thereof.
Figure 6:
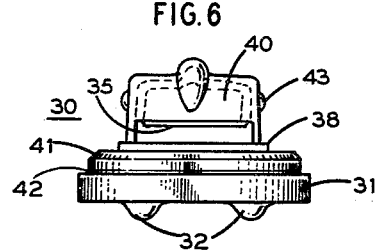
Fig. 6 is a front elevation view thereof.

In the embodiment of Figs. 4, 5 and 6, seal 30 comprises a rimmed base 31 having support ribs 32, the rim of the base being higher in its rearward portion than in its forward portion. A generally inverted channel shape top 35 is pivoted intermediate its ends to the forward part of the higher section of the rim of the base, as indicated at 33.

A generally flat spring 34 is bent about a cross pin 36 in base 31 so that its shorter arm 37 lies against the base and its longer arm 38 extends to the forward end of the seal. Arm 38 carries an upper seal element 41 cooperable with a mating lower seal element 42 in base 31.

Seal 30 is operated by a generally inverted channel shape operating lever 40 embracing top 35 in the closed position of the seal. Lever 40 is pivoted to the forward end of top 35, as indicated at 43. The forward end of lever 40 has cam surfaces 45 bearing against spring arm 38. When seal 30 is in the open position of Fig. 5, a document may be inserted between seal elements 41 and 42. Lever 40 is then swung to the closed position of Fig. 4, so that cam surfaces 45 force upper seal element 41 toward lower seal element 42 to impress the seal into the document.

Due to the nested relation of top 35 and lever 40, particularly in the closed position, a compact, easily stored and transported corporate seal is provided.

While specific embodiments of the invention have been shown and described in detail to illustrate the application of the invention principles, it will be understood that the invention may be embodied otherwise without departing from such principles.

What is claimed is:

A corporate seal comprising, in combination, a base having a lower seal element mounted adjacent its forward end and having upwardly extending side flanges; a top having downwardly extending side flanges cooperable with the base side flanges to provide a forwardly opening slot to receive a document to be sealed; a generally flat spring bent about a cross pin extending between the base flanges adjacent the rear end of the seal and having a lower leg engaging said base and an upper leg extending to substantially the front end of said seal; an upper seal element mounted at the forward end of said upper spring leg and mating with said lower seal element, said spring normally biasing said upper seal element away from said lower seal element; an inverted channel shape operating lever having flanges embracing the flanges of said top; means pivotally interconnecting the forward ends of said top and said lever for swinging movement of said lever into and out of embracing relation with said top; and cam means carried by said lever immediately adjacent the lever pivoting means and engaged with the forward upper surface of said upper spring leg; said cam means, upon movement of said lever toward embracing relation with said top, forcing said upper seal element toward said lower seal element to impress a seal on a document inserted in said slot; the length of said lever rearwardly from its pivot being several times the distance of said cam means from said pivot to provide an augmented mechanical advantage of said lever in forcing said seal elements toward each other; said cam means comprising a pin on said lever extending through an aperture in said top and engaging the upper spring leg at substantially the center of the upper seal element.

References Cited in the file of this patent

UNITED STATES PATENTS

| | | |
|---|---|---|
| 998,427 | Stigberg | July 18, 1911 |
| 1,016,292 | Roovers | Feb. 6, 1912 |
| 1,162,883 | Roovers | Dec. 7, 1915 |
| 1,209,458 | Leve | Dec. 19, 1916 |
| 1,306,905 | Jackson | June 17, 1919 |
| 1,471,688 | Eyman | Oct. 23, 1923 |
| 1,794,337 | Levy | Feb. 24, 1931 |
| 2,706,448 | Priesmeyer | Apr. 19, 1955 |